March 11, 1930. L. V. NOGUEIRA 1,749,984

WHEEL RIM LOCKING BOLT

Filed May 21, 1928

Inventor
L. V. NOGUEIRA

By Jack A. Schley
Attorney

Patented Mar. 11, 1930

1,749,984

UNITED STATES PATENT OFFICE

LUIS V. NOGUEIRA, OF DALLAS, TEXAS

WHEEL-RIM LOCKING BOLT

Application filed May 21, 1928. Serial No. 279,420.

This invention relates to new and useful improvements in wheel rim locking bolts.

One object of the invention is to provide a bolt with a rim retaining lug locked to the bolt instead of secured by a nut, whereby the rim may be locked on the wheel and theft defeated.

A further object of the invention is to provide a combined bolt and lug having a key operated lock and arranged to take the place of one of the bolts and lugs, by which the rim is secured on the wheel.

Another object of the invention is to provide a locked bolt and lug which will be easy to operate, positive in action and simple in construction.

A construction designed to carry out the invention will be hereinafter described, together with other features of the invention.

Figure 1:
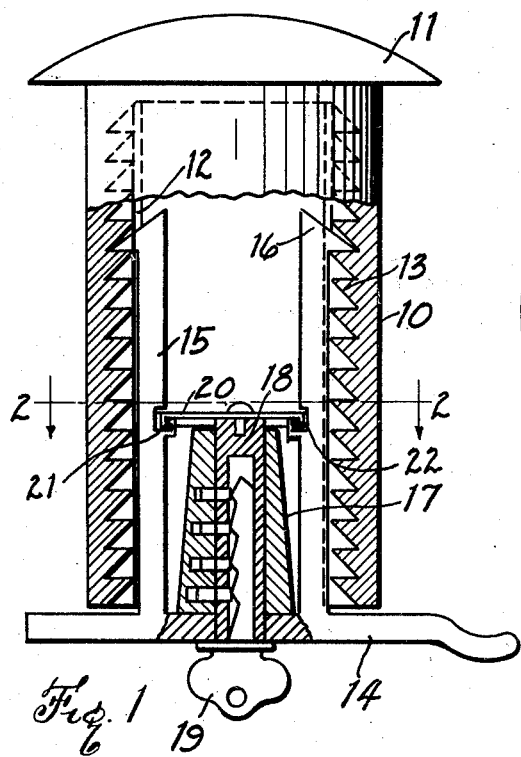
Figure 2:
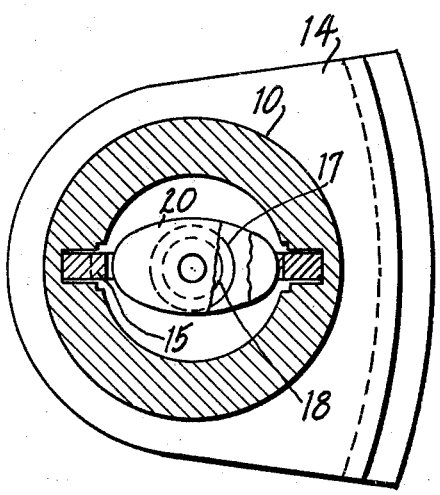
Figure 4:
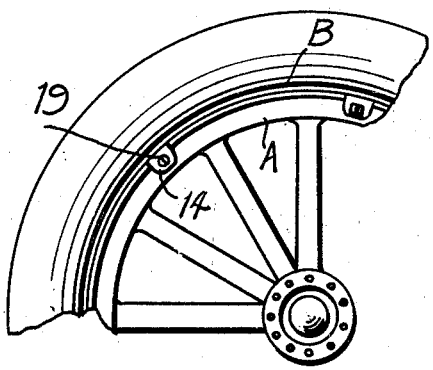
Figure 3:
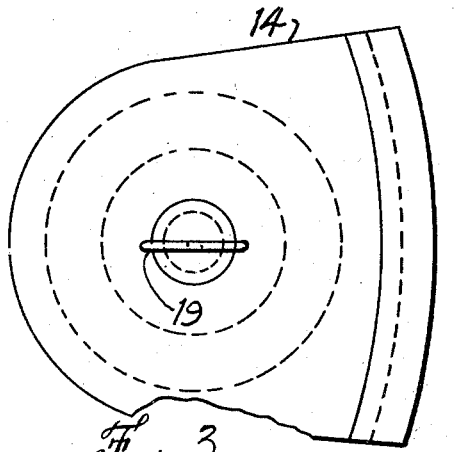

The invention will be more readily understood from a reading of the following specifications and by reference to the accompanying drawings, in which an example of the invention is shown, and wherein:

Fig. 1 is a greatly enlarged view of a bolt and lug constructed in accordance with my invention and shown partly in elevation and partly in section, Fig. 2 is a horizontal cross-sectional view taken on the line 2—2 of Fig. 1, Fig. 3 is a front elevation of the parts, and Fig. 4 is a partial elevation of a wheel showing the bolt and lug applied thereto.

In the drawings the numeral 10 designates an elongated bolt barrel having a bolt head 11 at one end. The barrel has a smooth bore provided with diametrically opposite grooves or guides 12, extending longitudinally thereof. In the bottom of each guide, ratchet teeth 13 are countersunk and the bore is open at one end.

A rim lug 14 having the usual shape has a pair of spring arms 15 formed integral with its inner side. These arms are spaced so as to correlate with the guides 12, when inserted in the barrel. Each arm has a ratchet dog 16 on its outer end arranged to engage in the teeth 13 and prevent removal of the lug.

A tapered lock cylinder 17 is secured to the inner side of the lug between the arms and a suitable lock barrel 18 is journaled in the lug and cylinder. Any suitable lock may be used, that shown employing a key 19 to rotate the barrel 18.

On the inner end of the lock barrel is an elongated actuating plate or retracting element 20. The plate has a laterally directed marginal flange 21 which conforms to the elliptical shape of the plate. The flange engages fingers 22 on the inner edges of the arms.

With the parts in the locked position shown in Fig. 1, it will be seen that by inserting the key 19 and rotating the barrel 18, the plate 20 will be likewise rotated. Owing to diminishing diameter, as the plate is rotated, the flange will draw the arms 15 toward each other, the tapered cylinder 17 permitting the arms to swing.

When the arms are retracted their dogs 16 will be withdrawn from the teeth 13, thus permitting the removal of the lug 14 and the parts carried thereby. The lug is locked in the bolt by inserting the arms with the dogs in the guides 12 pushing the lug to its limit and then turning and removing the key.

In using the device the barrel 10 is inserted in the bolt opening of the wheel felly A (Fig. 4) in place of one of the usual bolts and lugs. The arms 15 are retracted with the key 19 and plate 20 and inserted in the bore of the barrel with the dogs 16 in the guides 12. The lug is then pushed toward the bolt, whereby the rim B is engaged. When all the slack is taken up the key 19 is turned to release the arms and cause the dogs to spring into the teeth 13.

In order to balance the wheel, this bolt is used on the side opposite to the valve stem. The usual bolts and lugs are used for the balance of the wheel. The drawings, except Fig. 4, are enlarged and therefore in practice the teeth 13 would be close together, thus permitting comparatively fine adjustments. A rim secured with this bolt can not be removed without the key.

Various changes in the size and shape of the different parts, as well as modifications and alterations, may be made within the scope of the appended claims.

What I claim, is:

1. In a wheel rim bolt device, a bolt barrel open at one end and having a head at its opposite end, longitudinal guides within the barrel having countersunk teeth, a rim lug, movable arms carried by the lug and having dogs engaging in the guides and teeth when inserted in the barrel, a key rotated member carried by the lug, and means rotated by said member connected with said arms for swinging them into and out of engagement with the teeth.

2. In a wheel rim bolt device, a bolt barrel open at one end and having a head at its opposite end, longitudinal guides within the barrel having countersunk teeth, a rim lug, movable arms carried by the lug and having dogs engaging in the guides and teeth when inserted in the barrel, a key rotated member carried by the lug, a plate secured to and rotated by said key member, fingers on the arms, and a flange on the plate engaging said fingers, the plate being elliptical, whereby the arms are retracted upon rotation of said plate.

3. The combination with a wheel felly and the tire rim mounted thereon, of a hollow bolt passing through the felly and having its head engaged with the rim, a lug engaging the rim, locking elements carried by the lug and selectively engaging, one of a series of faces within the hollow bolt for adjusting and holding the lug against the rim, and key operated means carried by the lug for actuating said locking elements.

4. In a wheel rim bolt device, a tubular bolt having a series of interior teeth, a rim lug provided with parallel elongated members to successively engage said teeth, and locking means attached to the lug and including a plate directly connected to said members to control their engagement with the teeth.

5. In a wheel rim bolt device, a bolt barrel having a head and opposite series of interior teeth, a rim lug, parallel elongated retaining arms carried by the lug and successively engaging the teeth within the barrel, means intermediate said arms and interlocked therewith for retracting them from the teeth, and a lock upon said lug for operating and controlling said retracting means.

In testimony whereof I affix my signature.

LUIS V. NOGUEIRA.